Figure 1:
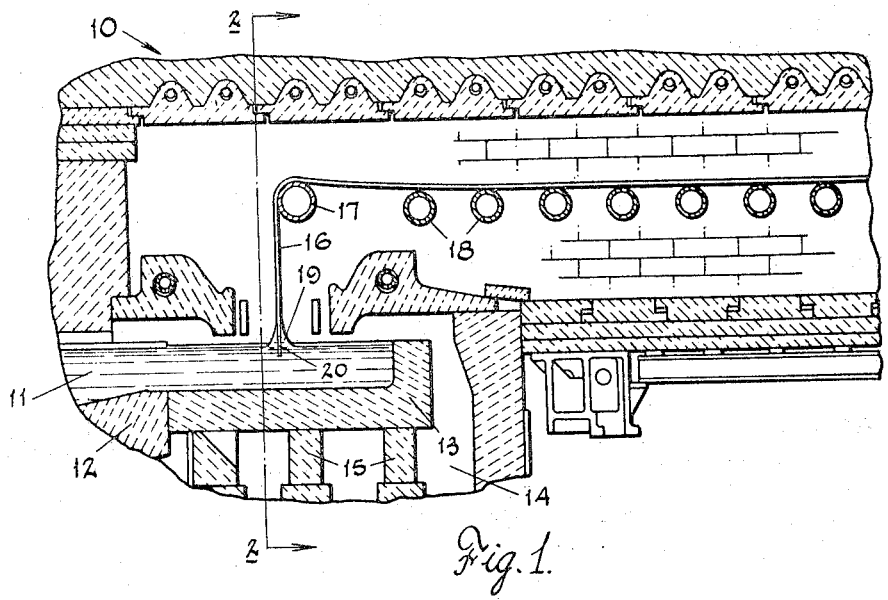

Dec. 27, 1966  A. E. BADGER ETAL  3,294,515
MEANS FOR MAINTAINING SHEET WIDTH WHILE
DRAWING SHEET GLASS
Filed May 28, 1962

INVENTORS
Alfred E. Badger and
BY Conrad B. Schafer

Nobbe & Swope
ATTORNEYS

United States Patent Office 3,294,515
Patented Dec. 27, 1966

3,294,515
MEANS FOR MAINTAINING SHEET WIDTH
WHILE DRAWING SHEET GLASS
Alfred E. Badger and Conrad B. Schafer, Maumee, Ohio, assignors to Libbey-Owens-Ford Glass Company, Toledo, Ohio, a corporation of Ohio
Filed May 28, 1962, Ser. No. 198,034
4 Claims. (Cl. 65—199)

The present invention relates to the production of sheet or window glass and more particularly to a method and apparatus for continuously drawing a ribbon of glass of improved quality and predetermined width from a mass of molten glass.

As is well known, so-called window or sheet glass is distinguished from ground and polished plate glass by the fact that it is flat drawn directly into final form and, at the same time, is given a natural fire finish so that it requires no subsequent treatment to impart smoothness and transparency.

Such glass is, of course, relatively easy and cheap to produce, but its disadvantage has been its tendency toward waviness and its susceptibility to distortion type defects. Indeed, in the past, these defects have come to be considered as necessary evils in, if not as distinguishing characteristics of, commercial sheet and window glass.

It is our opinion that this "distortion" in window glass is due primarily to lack of thickness uniformity or, differently expressed, to alternate thick and thin areas that occur in the glass ribbon as it is being drawn. The several varieties of distortion are known in the art by various names such as "long wave distortion," "short wave distortion," "hammer," "batter," etc. But we believe all of these result from a lack of sufficiently uniform temperature conditions from side to side of the mass of molten glass from which the sheet is being drawn; from the adverse influence of thermally induced air or convection currents that move toward, along and around the newly formed sheets; and/or from contact with or proximity to forming or treating elements that chill or otherwise interfere with attaining uniformity of temperature across the sheet as it rises from the mass of molten glass. Among such treating elements are the means commonly employed for maintaining the ribbon of glass to width as it is pulled from the mass of molten glass.

Briefly stated the present invention is based on our discovery of an improved method and apparatus for maintaining the newly-formed sheet to width and which, at the same time, eliminates or renders unnecessary certain features of existing window glass drawing machines that have been responsible for distortion in the finished glass.

It is therefore a primary object of the invention to materially improve the quality and character of flat drawn window glass and to increase the production capacity of present drawing equipment.

A further object is to provide an improved form of width maintaining device that will operate efficiently for its intended purpose with a minimum of adverse effect on the glass adjacent thereto or in contact therewith.

Another object is to reduce undesirable chilling of the molten glass at the source of the ribbon and to so reduce devitrification and dog metal in this area.

Still another object is to increase the width of usable sheet that can be drawn from a working receptacle of a given size and to minimize the amount of waste glass in the selvage edge of the glass ribbon.

A further object is to greatly reduce the number of, if not to entirely eliminate the open flames required in and around the zone of sheet formation.

Further objects and advantages will become more apparent during the course of the following description, when taken in connection with the accompanying drawings wherein like numerals are employed to designate like parts throughout the same.

Figure 2:
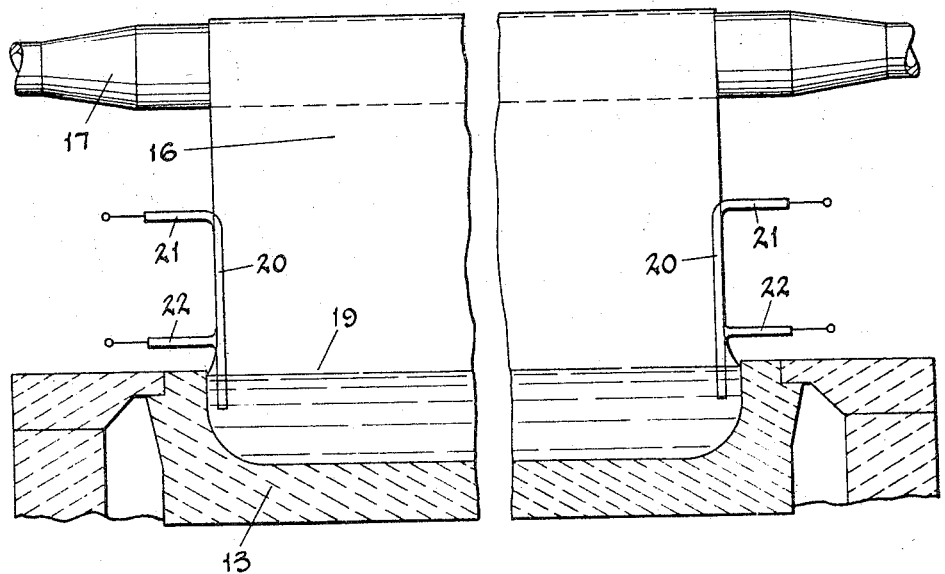

In the drawings:
FIG. 1 is a longitudinal, vertical, sectional view through a conventional window glass drawing machine of the Colburn type having the present invention associated therewith; and
FIG. 2 is a transverse sectional view taken substantially along the line 2—2 in FIG. 1.

Although the width maintaining means of this invention is in no way restricted to use with any specific kind of window glass forming machine and, indeed, may be readily adapted to any one of a number that are now in commercial use, it is believed to have its greatest potential when employed in the so-called Colburn type of window glass drawing machine and will be specifically described in that connection here.

Referring now more particularly to the drawings, there is designated in its entirety by the numeral 10 a representative Colburn type window glass drawing machine. In operating such a machine, a supply of molten glass 11 is created and maintained by melting raw glass making materials in the forward or melting end of a conventional glass tank furnace. This molten glass then moves progressively through the refining tank (not shown) and into the cooling or conditioning chamber 12 of the furnace, from which it passes to a working receptacle or draw pot 13 supported in a heated pot chamber 14 on stools 15.

In the production of window glass on machines of this character a ribbon of glass 16 is drawn vertically from the molten glass in the draw pot 13 for a short distance and then bent into the horizontal plane over a bending roll 17 from which it is conveyed on machine rolls 18 into and through an annealing lehr (not shown).

As the sheet 16 is pulled from the mass of molten glass it forms a meniscus 19 at its source and, unless means are provided to prevent it, the glass being drawn tends to neck-down progressively, or pull to a thread, and the sheet will soon be lost. This is due to the surface tension of glass which imparts a tendency to draw into rod rather than sheet form.

In common practice it has been customary to prevent the necking-down of the sheet by providing water cooled width maintaining members of various kinds to contact the opposite margins of the rising sheet at its base or meniscus and chill or otherwise act on the sheet edges in a manner to prevent or retard the normal tendency of the ribbon 16 to narrow and move inwardly before it reaches the bending roll 17.

The most successful of these previously known width maintainers have been in the form of pairs of water cooled knurled rolls that were mounted for rotation at opposite sides of the glass sheet with the opposed knurled surfaces of each pair engaging opposite sides of the margin of the rising sheet at the meniscus. By rotating such knurls at a speed slightly slower than the speed at which the ribbon is being drawn they act to produce a chilled margin of considerable width at each edge of the glass. In cross-section these margins exhibit a rounded shape at their extremities; adjacent converging, pinched-in areas where the knurled rolls actually contact the glass; an enlarged area just inwardly of the innermost point of contact by the knurls, where the excess glass is squeezed out; and a second tapering area inwardly of the enlarged area where the glass surfaces converge to the approximate thickness of the main body of the ribbon.

As indicated above these knurled rolls are probably the most effective form of width maintainers that have been devised up to the time of the present invention. However, they have a number of drawbacks. In the first place, as will be evident from the description above, the margins formed by the knurls, and which were responsible for holding the sheet to width, were of course marked by the knurled surface of the rolls and also presented alternate thick and thin portions making up what might be termed a selvage edge or margin of unusable glass. This was of considerable width and, since it had to be trimmed from the finished sheet represented a serious waste.

Also the fact that this selvage edge or frame was chilled by the knurls made it stiffen quickly and prevented it from conforming properly to and lying flat on the bending roll when it was drawn thereover. This necessitated the introduction of open flames along the edges of the glass sheet to soften the chilled margins sufficiently to permit them to bend into and move flatly along the horizontaly plane; and we believe that such open flames have been responsible for much of the uncontrolled air movement in the zone of sheet formation and for consequent distortion defects in the sheet.

Other characteristics of the knurled rolls that were probably responsible for distortion are that they were water cooled and had to be driven at a controlled speed. These factors necessitated the provision of openings in the wall of the machine at the zone of sheet formation in order to accommodate the necessary drive and fluid connecting means; and every opening in the walls in this area is, of course, a potential source of stray air movements and of heat transfer between the interior of the furnace and the much colder atmosphere outside. Also the water cooling caused the molten glass beneath the knurled rolls to cool and slowly devitrify. The resulting "dog" metal had to be dug out occasionally and operation of the machine was interrupted during these periods.

It has already been indicated that a principal feature of the present invention lies in the fact that its novel width maintaining means not only function efficiently for their intended purpose but that they also eliminate many if not all of the objectionable features of the prior devices that have been used to attain a similar result.

Thus, the width maintainers of this invention consist essentially of a pair of elongated members 20 lying in the path of and positioned, by means of any suitable and preferably insulated mounting means, so as to engage opposite edges of the rising glass sheet from a point at or within its meniscus 19 to a point below the bending roll 17.

These members 20 are preferably of a heat-resistant alloy, rod-like in form and approximately ¼" in diameter although they may be made of other materials and shaped to any desired cross-section. For example, they may be round, oval or square; symmetrical or non-symmetrical about a centerline; and of any convenient or desired thickness and length.

Because molten or viscous glass will stick readily to substances such as metal, the glass in the ribbon 16 that is being drawn upwardly between and in contact with the members 20 will adhere thereto and this adhesion will set up a tensile force, acting against the normal tendency of the rising ribbon or sheet to narrow, that will effectively hold the ribbon to a width predetermined by the location of the elements 20.

The length of these members will be determined by a number of factors such as machine speed, glass temperature, etc., but, generally speaking, they should be positioned with their lower ends dipping into the glass in the pot and should be long enough to remain in contact with the glass of the ribbon until it has substantially set into permanent sheet form. For example, assuming a bending roll height of 27" to 30" the point of separation might be from 15" to 24" above the glass level.

Also we have generally found it more advantageous to position the members 20 so that they converge slightly toward one another in the direction of the bending roll 17. However, this can be modified depending on the amount of tension it is deemed necessary, or found possible to exert on the glass in the ribbon and, under some circumstances, the members 20 may be positioned vertically and parallel to one another or arranged to diverge slightly in a direction away from the meniscus.

Although molten or viscous glass will stick to metal at various temperatures, and the location of the members 20 above the molten glass and in contact with the glass of the sheet will of itself act to heat such members, best results have been attained when the members 20 are maintained at a predetermined temperature which may be in the neighborhood of 1800 to 2000° F. and higher than that of the glass itself. To this end there may be provided suitable connections, indicated diagrammatically at 21 and 22 for supplying the electrical energy necessary for such heating.

The advantages of heating the members 20 are multifold. In the first place these members must be kept sufficiently hot to maintain the edge glass fluid enough to permit it to slide over the rods during upward movement of the sheet and to leave the upper end of the members 20 smoothly and without objectionable drag. Also the edges of the ribbon should still be at a sufficiently elevated temperature when they reach the bending roll 17 to bend easily thereover and to lie flat on the bending and machine rolls.

Further, the fact that the edge is not chilled while the rising ribbon is being held to width eliminates the necessity for open fires in the forming zone at and along the area of the sheet edge. Additional advantages of the improved width maintaining means is that they have no moving parts and are not water cooled so that no openings need be provided in the machine wall to accommodate driving or fluid connections. Also the fact that these width maintaining means are heated rather than cooled has the further advantage of discouraging the formation of divitrified glass or dog metal at the sides of the pot and at the base of the sheet meniscus where it has caused considerable difficulty in the past.

It is to be understood that the forms of the invention herewith shown and described are to be taken as illustrative embodiments only of the same, and that various changes in the shape, size and arrangement of parts, as well as various procedural changes may be resorted to without departing from the spirit of the invention or the intended scope of the appended claims.

We claim:

1. Apparatus for producing sheet glass, comprising a working receptacle for containing a mass of molten glass, means for continuously drawing a glass sheet upwardly from said mass of molten glass including a bending roll positioned above said working receptacle and about which the upwardly drawn sheet is deflected into a substantially horizontal plane for passage through an annealing lehr, an elongated width maintaining member positioned adjacent each edge of said sheet for engaging the edge of said upwardly drawn sheet moving therepast, each said elongated member extending into the molten glass in said working receptacle at its lower end and extending upwardly in engagement with said sheet to a point where said sheet has set sufficiently to substantially maintain its width upon disengaging said width maintaining member, and means heating said width maintaining members to a temperature above that of the sheet with which they are in contact.

2. Apparatus for producing sheet glass as claimed in claim 1, in which said width maintaining members extend upwardly from said mass of molten glass from about ½ to ⅞ the distance to said bending roll.

3. Apparatus for producing sheet glass as claimed in claim 1, wherein said bending roll is positioned about 27 to 30 inches above the surface of said mass of molten glass, and said width maintaining members extend upwardly from about 15 to 24 inches above said surface.

4. Apparatus for producing sheet glass as claimed in claim 1, in which said width maintaining members are connected to a source of electrical energy and are heated thereby to a temperature of from about 1800 to 2000 degrees F.

References Cited by the Examiner

UNITED STATES PATENTS

| | | | |
|---|---|---|---|
| 908,259 | 12/1908 | Heintz | 65—199 |
| 1,500,381 | 7/1924 | Frink et al. | 65—199 |
| 1,641,948 | 9/1927 | Blair | 65—201 |
| 1,841,660 | 1/1932 | Mambourg | 65—201 |
| 2,986,843 | 6/1961 | Loukomsky | 65—193 |

DONALL H. SYLVESTER, *Primary Examiner.*

J. H. NEWSOME, *Assistant Examiner.*